(12) United States Patent
Sakamoto

(10) Patent No.: US 8,586,239 B2
(45) Date of Patent: Nov. 19, 2013

(54) POSITIVE ELECTRODE FOR LITHIUM SECONDARY BATTERIES AND USE THEREOF

(75) Inventor: Hiroyuki Sakamoto, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 188 days.

(21) Appl. No.: 12/919,037

(22) PCT Filed: Jan. 26, 2009

(86) PCT No.: PCT/JP2009/051219
§ 371 (c)(1),
(2), (4) Date: Aug. 24, 2010

(87) PCT Pub. No.: WO2010/084622
PCT Pub. Date: Jul. 29, 2010

(65) Prior Publication Data
US 2011/0269017 A1    Nov. 3, 2011

(51) Int. Cl.
  *H01M 4/13*      (2010.01)
  *H01M 4/139*     (2010.01)
(52) U.S. Cl.
  USPC ......................................... 429/217; 29/623.5
(58) Field of Classification Search
  None
  See application file for complete search history.

(56) References Cited

U.S. PATENT DOCUMENTS

| | | | | |
|---|---|---|---|---|
| 6,824,924 B1 * | 11/2004 | Kurose et al. | ............ | 429/231.95 |
| 2004/0234850 A1 * | 11/2004 | Watarai et al. | ................ | 429/217 |
| 2007/0002523 A1 | 1/2007 | Ando et al. | | |
| 2010/0285369 A1 | 11/2010 | Takahata | | |
| 2010/0297497 A1 | 11/2010 | Takahata | | |

FOREIGN PATENT DOCUMENTS

| | | |
|---|---|---|
| CN | 1768404 | 5/2006 |
| JP | 5-21054 | 1/1993 |
| JP | 9-97625 | 4/1997 |
| JP | 10-106585 | 4/1998 |
| JP | 11-67277 | 3/1999 |
| JP | 2000-11991 | 1/2000 |
| JP | 2002-15726 | 1/2002 |
| JP | 2002-170556 | 6/2002 |
| JP | 2003-297337 | 10/2003 |
| JP | 2006-4739 | 1/2006 |
| JP | 2006004739 A * | 1/2006 |
| JP | 2009-170132 | 7/2009 |
| JP | 2009-176540 | 8/2009 |

OTHER PUBLICATIONS

International Search Report in International Application No. PCT/JP2009/051219; Mailing Date: Apr. 7, 2009.

* cited by examiner

*Primary Examiner* — Barbara Gilliam
*Assistant Examiner* — Stephan Essex
(74) *Attorney, Agent, or Firm* — Finnegan, Henderson, Farabow, Garrett & Dunner, LLP

(57) ABSTRACT

The invention provides a positive electrode for lithium secondary batteries, comprising a conductive layer overlaid on the surface of a positive electrode collector, and an active material layer overlaid on the conductive layer, wherein the conductive layer comprises at least one water-insoluble polymer, as a binder, that is soluble in organic solvents, and a conductive material; the active material layer comprises at least one aqueous polymer, as a binder, that is soluble or dispersible in water, a positive electrode active material, and a conductive material; and the average particle size ($D_A$) of the conductive material in the conductive layer is smaller than the average particle size ($D_B$) of the conductive material in the active material layer.

12 Claims, 3 Drawing Sheets

POSITIVE ELECTRODE FOR LITHIUM SECONDARY BATTERIES AND USE THEREOF

CROSS-REFERENCE TO RELATED APPLICATIONS

This application is a national phase application of International Application No. PCT/JP2009/051219, filed Jan. 26, 2009, the contents of which are incorporated herein by reference.

TECHNICAL FIELD

The present invention relates to a positive electrode used as a constituent element of a battery. More particularly, the present invention relates to a positive electrode for lithium secondary batteries, the positive electrode comprising a conductive layer overlaid on the surface of a positive electrode collector, and an active material layer overlaid on the conductive layer, and relates also to a use of the positive electrode for lithium secondary batteries.

BACKGROUND ART

Secondary batteries such as lithium secondary batteries and nickel-hydrogen batteries are gaining importance as power sources installed in vehicles that employ electricity as a driving source, and in electric devices such as personal computers, cell phones and the like. In particular, lithium secondary batteries are expected to be used as preferred high-output power sources in vehicles, thanks to their light weight and the high energy density that they afford.

In a typical construction, one such lithium secondary battery comprises an electrode collector, and provided on the surface thereof, electrode active material layers (specifically, a positive electrode active material layer and a negative electrode active material layer) that are capable of reversibly storing and releasing lithium ions. In the case of a positive electrode, for instance, a positive electrode active material layer is formed by coating a positive electrode collector with a paste-like composition for forming positive electrode active material layers (the term paste-like composition includes slurry-like compositions or ink-like compositions; likewise hereafter), wherein the paste-like composition is prepared by mixing, for instance, a positive electrode active material, such as a lithium-transition metal complex oxide, a high-conductivity material powder (conductive material), and a binder, in an appropriate solvent.

The solvent used in the mixture for preparing the above paste-like composition may be an aqueous solvent. As compared with a paste-like composition obtained using an organic solvent (hereafter, "non-aqueous paste" or "non-aqueous composition"), a paste-like composition obtained using an aqueous solvent (hereafter, "aqueous paste" or "aqueous composition") is advantageous overall in terms of environmental burden, since the aqueous paste utilizes little organic solvent and generates thus little industrial waste associated therewith. Moreover, no equipment is required for treating that waste, and thus no treatment costs are incurred.

Depending on the positive electrode active material, however, the pH of the aqueous paste tends to increase on account of the high reactivity with water of the positive electrode active material (for instance, an oxide of composition formula $LiNiO_2$ in the case of a lithium-nickel complex oxide). Compounds of high electric resistivity (for instance, oxides or hydroxides) are formed on the surface of a metallic positive electrode collector (for instance, of aluminum) when an aqueous paste of high pH is coated onto the surface of such a collector. The positive electrode collector may corrode as a result, which may cause the internal resistance of the battery to increase.

Patent Documents 1 and 2 disclose conventional technologies relating to battery electrodes using such aqueous pastes. In Patent Document 1, formation of high electric resistivity compounds, which give rise to corrosion of positive electrode collectors, can be prevented by interposing a conductive layer, containing a conductive material and formed out of a non-aqueous paste, between a positive electrode collector and an active material formed out of an aqueous paste. Patent Document 2 discloses the feature of equalizing current collection by a collector through formation of a carbon film, having a specific lattice plane spacing, on a collector made of aluminum.

Patent Document 1: Japanese Patent Application Laid-open No. 2006-4739
Patent Document 2: Japanese Patent Application Laid-open No. 10-106585

However, lithium secondary batteries having a structure comprising a stack of two layers prepared out of paste-like compositions of mutually different character, i.e. aqueous and non-aqueous, as in the case of the above-described technologies, are susceptible to loss of adherence between layers and drops in conductivity after long-term use.

A lithium secondary battery may conceivably be used over long periods of time under repeated high-rate charge and discharge (high-speed charge and discharge). Typical examples of lithium secondary batteries that may be used in that state include, for instance, lithium secondary batteries employed as power sources in vehicles (typically, automobiles, in particular hybrid automobiles and electric automobiles). Lithium secondary batteries under repeated high-rate charge and discharge are subjected to substantial load. This raises the concern of delamination between the two stacked layers prepared out of paste-like compositions having dissimilar characters i.e. aqueous and non-aqueous.

DISCLOSURE OF THE INVENTION

Thus, the purpose of the present invention, which has been conceived with a view to solving conventional problems relating to the manufacture of a positive electrode for lithium secondary batteries, is to provide a positive electrode that has a conductive layer, containing a conductive material and formed out of a non-aqueous paste-like composition, interposed between a positive electrode collector and an active material layer that is formed out of an aqueous paste-like composition, such that the positive electrode has excellent conductivity and is not prone to delaminate between layers (i.e. has high adherence between layers), even under high-rate charge and discharge, and to provide a method for manufacturing such a positive electrode. A further object of the present invention is to provide a lithium secondary battery comprising such a positive electrode, and a vehicle equipped with such a battery.

In order to achieve the above object, the present invention provides a positive electrode for lithium secondary batteries comprising a conductive layer overlaid on the surface of a positive electrode collector, and an active material layer overlaid on the conductive layer. In the positive electrode for lithium secondary batteries according to the present invention, the conductive layer comprises at least one water-insoluble polymer, as a binder, that is soluble in organic solvents, and a conductive material; the active material layer comprises at least one aqueous polymer, as a binder, that is soluble or dispersible in water, a positive electrode active material, and a conductive material; and the average particle size ($D_A$) of the conductive material in the conductive layer is smaller than the average particle size ($D_B$) of the conductive material in the active material layer.

In the description of the present invention, the term "lithium secondary battery" denotes a secondary battery in which lithium ions are used as electrolyte ions, and charge and discharge are realized through transfer of the lithium ions between the positive and negative electrodes. Secondary batteries ordinarily called lithium ion batteries are a typical example of the batteries encompassed by the lithium secondary batteries in the description of the present invention.

In the description of the present invention, the term "positive electrode active material" denotes an active material, on the positive electrode side, that is capable of reversibly storing and releasing (typically, inserting and removing) chemical species (herein, lithium ions) that function as charge carriers in the secondary battery.

The positive electrode for lithium secondary batteries provided by the invention has a multilayer structure that comprises a conductive layer overlaid on the surface of a positive electrode collector, and an active material layer overlaid on the conductive layer. The compositions that constitute the respective layers comprise conductive materials having dissimilar average particle sizes. Specifically, the conductive layer of the positive electrode for lithium secondary batteries according to the present invention comprises a conductive material having an average particle size ($D_A$) that is smaller than the average particle size ($D_B$) of the conductive material in the active material layer. The relationship between the average particle size ($D_A$) of the conductive material in the conductive layer and the average particle size ($D_B$) of the conductive material in the active material layer satisfies the relationship $D_A<D_B$. In a positive electrode having the above configuration, adherence between layers can be increased, and delamination made less likely, through the anchor effect elicited by the conductive material as a result of overlaying an active material layer comprising a conductive material having a large average particle size, on a conductive layer comprising a conductive material having an average particle size that is smaller than the former. Delamination between layers (and within layers) becomes thereby less likely, even under high-rate charge and discharge. A high-quality positive electrode for lithium secondary batteries is provided as a result.

In a preferred mode of the positive electrode for lithium secondary batteries disclosed herein, a particle size ratio ($D_B/D_A$) of the average particle size ($D_A$) of the conductive material in the conductive layer and the average particle size ($D_B$) of the conductive material in the active material layer satisfies the relationship ($D_B/D_A$)>1.28. The anchor effect of the conductive material is brought out yet more distinctly when the particle size ratio ($D_B/D_A$) of the conductive materials in the conductive layer and the active material layer is greater than 1.28, in which case the multilayer structure of the positive electrode exhibits excellent adherence despite the fact that the respective layers comprise dissimilar binders. Moreover, delamination between layers (and within layers) becomes thereby less likely, even under high-rate charge and discharge. This has the effect of preventing formation of compounds having high electric resistivity and which give rise to corrosion of the positive electrode collector. A high-quality positive electrode for lithium secondary batteries in which rises in internal resistance are suppressed can be provided as a result.

In another preferred mode of the positive electrode for lithium secondary batteries disclosed herein, a relationship of a specific surface area ($C_A$) [m²/g] of the conductive material and a weight per unit surface area ($W_A$) [g/m²] of the conductive material in the conductive layer, and a specific surface area ($C_B$) [m²/g] of the conductive material and a weight per unit surface area ($W_B$) [g/m²] of the conductive material in the active material layer satisfies ($C_B W_B/C_A W_A$)<5.4. The conductive layer has the function of precluding direct contact between water (typically, between an active material layer formed through application of an aqueous paste) and the positive electrode collector, and of preserving sufficient conductivity between the active material layer and the positive electrode collector so that resistance therebetween does not become excessive. A greater content of conductive material in the conductive layer results in higher conductivity, but translates, conversely, into a relatively lower proportion of binder, which may detract from adherence between layers. However, adherence can be preserved, with secured conductivity, in a positive electrode where the value ($C_B W_B/C_A W_A$) of the relationship between the specific surface area and weight per unit surface area of the conductive materials in the conductive layer and the active material layer is smaller than 5.4. A positive electrode for lithium secondary batteries having high adherence between layers, and in which rises in internal resistance are suppressed, can be provided as a result.

In a positive electrode according to another mode, a total sum ($W_A+W_C$) of a weight per unit surface area ($W_A$) [g/m²] of the conductive material in the conductive layer and a weight per unit surface area ($W_C$) [g/m²] of the binder in the conductive layer ranges from 0.25 g/m² to 5.0 g/m², per face of the collector. A conductive layer having appropriate conductivity and adherence is formed when the total weight of binder and conductive material per unit surface area in the conductive layer lies within the above range. Charge is transferred with high efficiency in a positive electrode where a conductive layer having the above features is interposed between the positive electrode collector and the active material layer. A positive electrode for lithium secondary batteries in which rises in internal resistance are suppressed can be provided as a result.

In yet another mode of the positive electrode for lithium secondary batteries disclosed herein, the content of conductive material in the conductive layer ranges from 20 wt % to 50 wt %, relative to a total 100 wt % of the water-insoluble polymer and the conductive material in the conductive layer. Adherence can be improved, while preserving conductivity, by setting the content of conductive material included in the conductive layer to be no greater than half the total. As a result there can be provided a positive electrode for lithium secondary batteries in which sufficient conduction paths (conductive paths) are secured, even in the presence of the interposed conductive layer, and in which rises in internal resistance are suppressed.

Preferably, the conductive material comprises particulate carbon. The conductive material is preferably a conductive powder, for instance various types of carbon black. A positive electrode comprising an active material layer and a conductive layer of good conductivity can be provided by using, as a conductive material, particulate carbon in which particles are not fused to one another.

Preferably, the conductive layer comprises polyvinylidene fluoride (PVDF) as the binder, and the active material layer comprises carboxymethylcellulose (CMC) as the binder. The conductive layer and the active material layer are strongly bonded to each other in a positive electrode comprising the above respective binders. A positive electrode for lithium secondary batteries can be provided as a result wherein delamination between layers becomes less likely, even under high-rate charge and discharge.

Another aspect of the present invention provides a method for manufacturing a positive electrode for lithium secondary batteries. The manufacturing method provided by the present invention is a method for manufacturing a positive electrode for lithium secondary batteries, the positive electrode having a multilayer structure that comprises a conductive layer layered on the surface of a positive electrode collector, and an active material layer layered on the conductive layer, the method comprising forming the conductive layer using a non-aqueous composition for conductive layer formation that comprises at least one water-insoluble polymer, as a binder, that is soluble in organic solvents, and a particulate conductive material; and forming the active material layer using an aqueous composition for active material layer formation that comprises at least one aqueous polymer, as a binder, that is soluble or dispersible in water, and a particulate conductive material. In the method disclosed herein, a conductive material having an average particle size ($D_A$) smaller than the average particle size ($D_B$) of the conductive material included in the aqueous composition for active material layer formation is used as the conductive material included in the non-aqueous composition for conductive layer formation. In such a method, adherence between layers is enhanced through the anchor effect elicited by the conductive material and which results from layering, on the conductive layer, an active material layer through the use of an aqueous composition for active material layer formation that comprises a conductive material having an average particle size greater than the average particle size of the conductive material included in the conductive layer. A method for manufacturing a high-quality positive electrode for lithium secondary batteries can be provided as a result wherein the suppressing effect on delamination between layers (and delamination within layers) is enhanced, and wherein rises in internal resistance are also suppressed.

In a preferred mode of the method for manufacturing a positive electrode for lithium secondary batteries disclosed herein, the non-aqueous composition for conductive layer formation and the aqueous composition for active material layer formation are prepared in such a manner that a particle size ratio ($D_B/D_A$) of the average particle size ($D_A$) of the conductive material included in the non-aqueous composition for conductive layer formation and the average particle size ($D_B$) of the conductive material included in the aqueous composition for active material layer formation is ($D_B/D_A$) >1.28. The anchor effect of the conductive material is brought out yet more distinctly when the non-aqueous composition for conductive layer formation and the aqueous composition for active material layer formation are prepared in such a manner that the particle size ratio ($D_B/D_A$) of the conductive materials in the conductive layer and the active material layer satisfies the relationship ($D_B/D_A$)>1.28. As a result there can be provided a method for manufacturing a positive electrode in which delamination between layers (and within layers) is less likely, while preserving conductivity, even in a stack of layers comprising dissimilar binders.

Preferably, polyvinylidene fluoride (PVDF) is used as the binder included in the non-aqueous composition for conductive layer formation, and carboxymethylcellulose (CMC) is used as the binder included in the aqueous composition for active material layer formation. As a result there can be provided a method for manufacturing a positive electrode in which delamination between layers is unlikely, even under high-rate charge and discharge, by forming a conductive layer and an active material layer through the use of a non-aqueous composition for conductive layer formation and an aqueous composition for active material layer formation comprising such respective binders.

The present invention provides also a lithium secondary battery that comprises any of the disclosed positive electrodes (likewise positive electrodes manufactured by any of the disclosed methods). The present invention further provides a vehicle comprising the above lithium secondary battery. The positive electrode for lithium secondary batteries provided by the invention can be a positive electrode of adequate quality (for instance, in terms of suppression of rises in internal resistance) in lithium secondary batteries installed in vehicles. Such a lithium secondary battery can be appropriately used, therefore, as a power source for motors in vehicles, for instance automobiles equipped with an (electric) motor, such as hybrid automobiles, electric vehicles, and fuel cell automobiles.

BEST MODE FOR CARRYING OUT THE INVENTION

Figure 1:
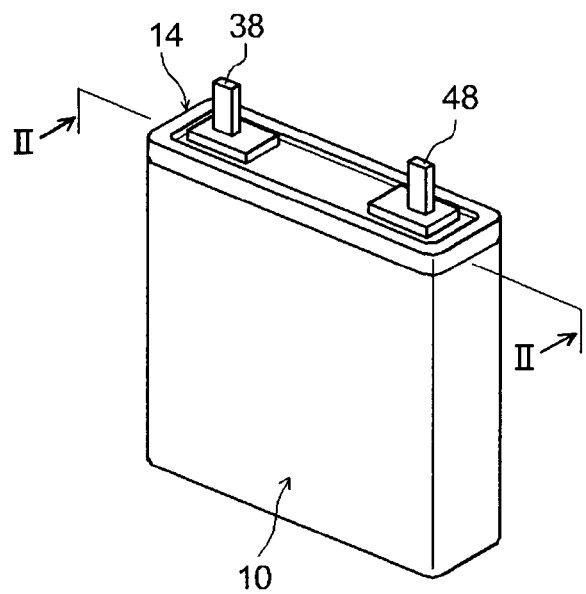
FIG. 1 is a perspective-view diagram illustrating schematically the outer appearance of a lithium secondary battery according to one embodiment.

Preferred embodiments of the present invention are explained below. Any features other than the features specifically set forth in the present description and which may be necessary for carrying out the present invention can be regarded as design matter for a person skilled in the art on the basis of known techniques in the technical field in question. The present invention can be carried out on the basis of the disclosure of the present description and common technical knowledge in the technical field in question.

The positive electrode for lithium secondary batteries according to the present invention is characterized by comprising a conductive layer on the surface of a positive electrode collector, and an active material layer overlaid on the conductive layer. A detailed explanation follows next on a rectangular-shaped lithium secondary battery (lithium ion battery) built using a positive electrode having the multilayer structure disclosed above. However, the present invention is in no way meant to be limited to such an embodiment. Charge and discharge may be realized in the battery through transfer of lithium ions as charge carriers, but the configuration of a negative electrode, a battery case, an electrolyte and so forth is not particularly limited. For instance, the battery case may have a parallelepiped shape, a flat shape, a tubular shape or the like, while the features of the negative electrode and the electrolyte can be appropriately modified depending on the application (typically on-board applications).

In the drawings below, members and portions having the same function are denoted with identical reference numerals, and a recurrent explanation thereof will be omitted or simplified. The dimensional relationships in the figures (length, width, thickness and so forth) do not reflect actual dimensional relationships.

Figure 2:
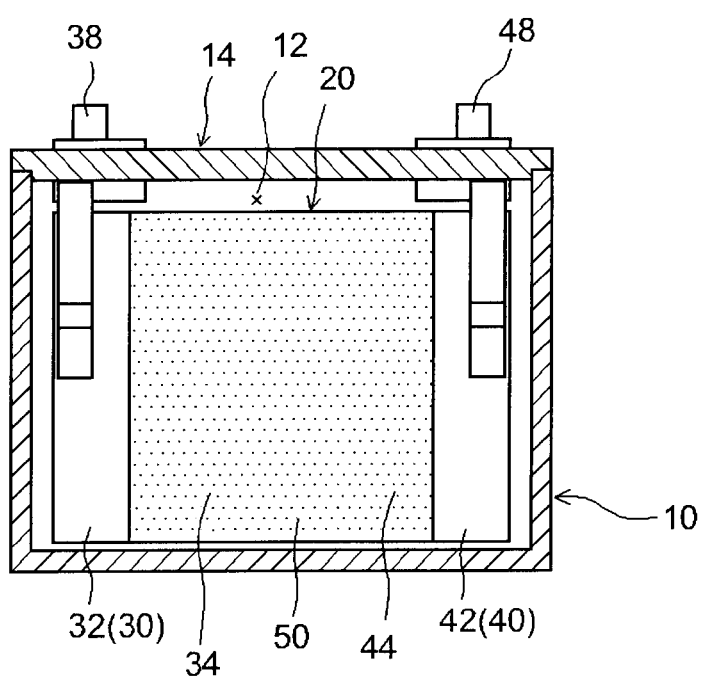
FIG. 2 is a cross-sectional diagram of FIG. 1 along line II-II.
Figure 3:
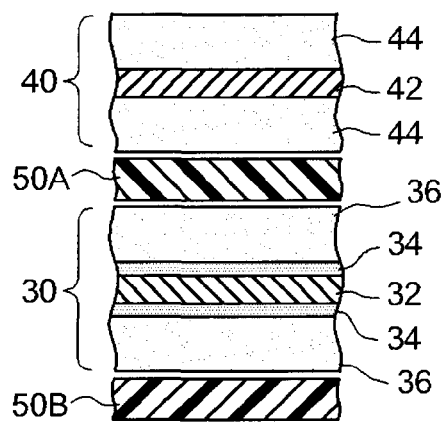
FIG. 3 is a cross-sectional diagram illustrating positive-negative electrodes and separators that make up a wound electrode body according to one embodiment.

FIG. 1 is a perspective-view diagram illustrating schematically a rectangular-shaped lithium secondary battery according to one embodiment. FIG. 2 is a cross-sectional diagram of FIG. 1 along line II-II, and FIG. 3 is a cross-sectional diagram illustrating positive and negative electrodes and separators that make up a wound electrode body according to one embodiment.

As illustrated in FIG. 1, a lithium secondary battery 100 according to the present embodiment comprises a parallelepiped battery case 10, and a lid 14 that plugs an opening 12 of the case 10. A flat electrode body (wound electrode body 20) and an electrolyte can be stuffed into the battery case 10 via the opening 12. The lid 14 comprises a positive electrode terminal 38 and a negative electrode terminal 48 for external connection, such that part of each terminal 38, 48 protrudes beyond the surface of the lid 14.

In the present embodiment, the wound electrode body 20 is held in the case 10, as illustrated in FIG. 2. The electrode body 20 comprises a positive electrode sheet 30 in which conductive layers 34 and active material layers 36 are formed on the surface of an elongated sheet-like positive electrode collector 32; a negative electrode sheet 40 in which negative electrode active material layers 44 are formed on the surface of an elongated sheet-like negative electrode collector 42; and elongated sheet-like separators 50A, 50B. The wound electrode body 20, which is obtained by stacking and winding together the positive electrode sheet 30, the negative electrode sheet 40 and the two separators 50A, 50B as illustrated in FIG. 3, is then squashed from the sides to yield a flat shape.

The positive electrode collector 32 is exposed at one end of the wound positive electrode sheet 30, in the longitudinal direction thereof, with no conductive layers 34 or active material layers 36 being formed at that end. The negative electrode collector 42 is exposed at one end of the wound negative electrode sheet 40, in the longitudinal direction thereof, with no negative electrode active material layers 44 being formed at that end. The positive electrode terminal 38 is connected to the exposed end of the positive electrode collector 32, while the negative electrode terminal 48 is connected to the exposed end of the negative electrode collector 42. The positive electrode sheet 30 and the negative electrode sheet 40 of the flattened wound electrode body 20 are electrically connected as a result. The positive-negative electrode terminals 38, 48 and the positive-negative electrode collectors 32, 42 can be connected, for instance, by ultrasonic welding, resistance welding or the like.

The various constituent elements of the positive electrode of the lithium secondary battery 100 according to the present embodiment will be explained first. The positive electrode for lithium secondary batteries (typically, the positive electrode sheet 30) disclosed herein comprises the conductive layers 34 stacked on the surface of the positive electrode collector 32, and the active material layers 36 formed on the conductive layers 34, such that the conductive layers 34 and the active material layers 36 comprise mutually different compositions. The conductive layers 34 comprise a conductive material and, as a binder, at least one water-insoluble polymer that is soluble in organic solvents. The active material layers 36 comprise, as a binder, at least one aqueous polymer that is soluble or dispersible in water, as well as a positive electrode active material and a conductive material.

As the positive electrode collector 32 there is preferably used a conductive member comprising a metal of good conductivity, for instance aluminum or an alloy having aluminum as a main component. The shape of the positive electrode collector 32 varies depending on, among others, the shape of the lithium secondary battery, and hence is not particularly limited. The positive electrode collector 32 can be shaped as a rod, plate, sheet, foil, mesh or the like. A sheet-like positive electrode collector 32 made of aluminum can be preferably used in the lithium secondary battery 100 comprising the wound electrode body 20 of the present embodiment.

The conductive material used in the positive electrode of the lithium secondary battery 100 is not limited to specific conductive materials, and may be a conductive material used in conventional secondary batteries. The conductive material used may be, for instance, particulate carbon such as carbon powder or carbon fibers. Examples of the carbon powder that can be used include, for instance, various types of carbon black (for instance, acetylene black, furnace black, Ketjen black), graphite powder or the like. These can be used singly or in combinations of two or more. The carbon powder can be used crushed into particles, to afford better dispersibility.

The preferred average particle size (based on TEM micrographs, likewise hereafter) of the conductive material is no greater than 1 μm (for instance, no greater than 500 nm, preferably no greater than 100 nm). The resistance of the conductive layers 34 is kept no greater than about 20 mΩ·cm$^2$ thanks to the increased conductivity achieved in conductive layers 34 that are formed using a conductive material having such an average particle size. Carbon black having acetylene black as a main component and an average particle size no greater than 1 μm elicits a particularly distinctive effect.

The binder in the conductive layers 34 according to the present embodiment is a water-insoluble polymer that is soluble in organic solvents but insoluble in water. Examples of such a polymer include, for instance, polyvinylidene fluoride (PVDF), polyvinylidene chloride (PVDC), polyacrylonitrile (PAN), polypropylene oxide (PPO), poly(ethylene oxide-propylene oxide) copolymers (PEO-PPO) or the like. PVDF is particularly preferred as the binder.

The binder in the active material layers 36 according to the present embodiment is an aqueous polymer that is insoluble in organic solvents but is soluble or dispersible in water. Examples of hydrophilic polymers that dissolve in water include, for instance, various cellulose derivatives such as carboxymethylcellulose (CMC), methyl cellulose (MC), cellulose acetate phthalate (CAP), hydroxypropyl methylcellulose (HPMC), hydroxypropyl methylcellulose phthalate (HPMCP) and the like. Examples polymers that disperse in water include, for instance, polyethylene oxide (PEO), fluororesins such as polytetrafluoroethylene (PTFE), tetrafluoroethylene-perfluoroalkyl vinyl ether copolymers (PFA), tetrafluoroethylene-hexafluoropropylene copolymers (FEP), ethylene-tetrafluoroethylene copolymers (ETFE) or the like, vinyl acetate copolymers, styrene-butadiene block copolymers (SBR), acrylic acid modified SBR resins (SBR latex), or gums such as gum arabic. CMC is particularly preferred as the binder.

A particulate active material capable of storing and releasing lithium is used as the positive electrode active material included in the active material layers 36 that are used in the positive electrode of the lithium secondary battery 100 disclosed herein. Preferably there can be used, for instance, a positive electrode active material of an oxide having a layered structure, or a positive electrode active material of an oxide having a spinel structure, which are known positive electrode active materials in these kind of lithium secondary batteries. Examples thereof include, for instance, lithium-transition metal complex oxides such as lithium-nickel complex oxides, lithium-cobalt complex oxides, lithium-manganese complex oxides and the like.

As used herein, the term lithium-nickel complex oxide denotes oxides having lithium (Li) and nickel (Ni) as constituent metal elements, and also oxides that, besides lithium and nickel, comprise as constituent metal elements at least one other metal element (specifically, a typical metal element other than Li and Ni and/or a transition metal element), typically in a proportion smaller than that of nickel (on atom number basis; when two or more metal elements other than Li and Ni are used, the total amount thereof equates a proportion smaller than that of Ni). Examples of metal elements other than Li and Ni include, for instance, one, two or more metal elements selected from the group consisting of cobalt (Co), aluminum (Al), manganese (Mn), chromium (Cr), iron (Fe), vanadium (V), magnesium (Mg), titanium (Ti), zirconium (Zr), niobium (Nb), molybdenum (Mo), tungsten (W), copper (Cu), zinc (Zn), gallium (Ga), indium (In), tin (Sn), lanthanum (La) and cerium (Ce). The same applies to lithium-cobalt complex oxides and lithium-manganese complex oxides. Lithium-nickel complex oxides (for instance, $LiNiCoAlO_2$) are particularly preferred positive electrode active materials.

As the above lithium-transition metal oxide there can be used, for instance, a lithium-transition metal oxide powder (hereafter referred to also as particulate active material) without further modification, prepared or provided in accordance with conventional methods. For instance, the oxide may be prepared by mixing various starting material compounds, appropriately selected in accordance with the atomic composition, to a predetermined mole ratio, followed by firing of the resulting mixture using appropriate means. A particulate lithium-transition metal oxide powder, consisting essentially of secondary particles having a desired average particle size and/or particle size distribution, can be obtained by crushing, granulating and sorting the fired product using appropriate means. The method itself for preparing the lithium-transition metal oxide powder is not a characterizing feature of the present invention.

A method for manufacturing the positive electrode according to the present embodiment is explained below.

In the method disclosed herein, a non-aqueous composition for conductive layer formation is applied to the surface of the positive electrode collector 32 (to one or both surfaces of the collector, depending on shape and/or application). Next, an aqueous composition for active material layer formation is applied to the formed conductive layers 34, to overlay active material layers 36 thereon.

The non-aqueous composition for conductive layer formation is a non-aqueous paste (or slurry) prepared by mixing a conductive material, an organic solvent and at least one water-insoluble polymer, as a binder, that is soluble in organic solvents but insoluble in water. For instance, a non-aqueous composition for conductive layer formation can be prepared by mixing an appropriate conductive material (for instance, acetylene black) and a binder (for instance, PVDF), to appropriate weight proportions, in a non-aqueous solvent. Examples of preferred non-aqueous solvents (organic solvents) for preparing the above non-aqueous paste include, for instance, N-methyl-2-pyrrolidone (NMP), methyl ethyl ketone, toluene or the like.

In order to form the conductive layers 34 having excellent adhesive performance by using the above-described non-aqueous composition for conductive layer formation, it is preferable to blend the conductive material and the water-insoluble polymer (binder) in such a manner that the content of the conductive material ranges from 20 wt % to 50 wt % (more preferably, from 20 wt % to 40 wt %, in particular from 20 wt % to 35 wt %), relative to a total 100 wt % of the conductive material and the water-insoluble polymer. A content of conductive material in excess of 50 wt % yields good conductivity but may give rise to delamination and increased internal resistance in the battery, and is hence undesirable. By contrast, a content of conductive material is smaller than 20 wt % results in poor conductivity (i.e. fewer conductive paths), and is hence undesirable. However, adherence can be improved, while preserving conductivity, by setting the content of conductive material included in the conductive layers 34 to lie within the above range, i.e. to be no greater than half the total.

The conductive layers 34 can be formed by applying the prepared non-aqueous composition for conductive layer formation to the surface of the positive electrode collector 32, and drying then the solvent included in the paste. The technique employed for applying the non-aqueous composition for conductive layer formation onto the positive electrode collector 32 may be identical to known techniques of conventional methods. For instance, the composition may be applied using a coating device such as a slit coater, a gravure coater, a die coater, a comma coater or the like. The conductive layers 34 can be adjusted to a desired thickness by compression after drying, as the case may require. The compression method employed may be a conventional compression method, such as roll pressing, or pressing using a plate press. The thickness of the layers may be measured using a film thickness measurement instrument, and compression may be carried out a number of times, adjusting the pressure of the press, until achieving a desired thickness.

The coating thickness is not particularly limited so long as sufficient conduction paths (conductive paths) can be secured in the conductive layers 34, although, preferably, coating is performed in such a manner that thickness ranges for instance from 0.1 μm to 5.0 μm (more preferably, from 1.0 μm to 4.0 μm) per face of the positive electrode collector 32. A coating thickness of 5.0 μm or greater results in decreased conductivity and lower battery capacity retention. A thickness of 0.1 μm or less yields excessively thin conductive layers 34 interposed between the positive electrode collector 32 and the active material layers 36. This may result in corrosion of the collector 32, and therefore such a thickness is undesirable.

The sum total $(W_A + W_C)$ of the weight per unit surface area $(W_A)$ [g/m$^2$] of the conductive material in the conductive layers 34 and the weight per unit surface area $(W_C)$ [g/m$^2$] of the binder in the conductive layer 34 of the conductive material according to the present embodiment ranges from 0.25 g/m$^2$ to 5.0 g/m$^2$ (preferably, from 0.5 g/m$^2$ to 4.0 g/m$^2$, more preferably from 1.0 g/m$^2$ to 3.5 g/m$^2$, and in particular from 1.7 g/m$^2$ to 3.2 g/m$^2$) per face of the positive electrode collector 32. Conductive layers having appropriate conductivity and adherence can be formed when the total weight of binder and conductive material per unit surface area in the conductive layers 34 lies within the above ranges.

After application of the above-described non-aqueous paste for forming conductive layers onto the positive electrode collector 32, the collector is preferably heated, in an appropriate dryer, up to a maximum temperature ranging from 140 to 150° C. Such a drying treatment causes the organic solvent in the non-aqueous composition for conductive layer formation to be removed quickly, and rises to an appropriate level the degree of crystallization of the water-insoluble polymer included in the non-aqueous composition for conductive layer formation. The above procedure allows forming conductive layers 34 on the collector surface to a predetermined thickness.

After formation of the conductive layers 34 through application of the non-aqueous composition for conductive layer formation as described above, the active material layers 36 are overlaid by applying an aqueous composition for active material layer formation on the conductive layers 34. Such an aqueous composition for active material layer formation is an aqueous paste (or slurry) prepared by mixing a positive electrode active material, at least one aqueous polymer, as a binder, that is a insoluble in organic solvents but is soluble or dispersible in water, a conductive material, and an aqueous solvent (typically water). The aqueous paste for active material layer formation can be prepared, for instance, by mixing at least one appropriate positive electrode active material (for instance, a lithium-transition metal complex oxide such as $LiNiO_2$, $LiCoO_2$ or $LiMn_2O_4$), a binder (for instance, CMC), and a conductive material (for instance, acetylene black), to appropriate weight proportions, in water (for instance, deionized water). The aqueous solvent used for preparing the aqueous paste is preferably water or a mixed solvent having water as a main component. Examples of solvents other than water that make up such a mixed solvent can be appropriately selected in the form of one, two or more organic solvents that can be mixed homogeneously with water (such as lower alcohols and lower ketones). For instance, there is preferably used an aqueous solvent having no less than about 80 wt % (more preferably, no less than about 90 wt %, yet more preferably no less than about 95 wt %) of water. In a particularly preferred example, the aqueous solvent (for instance, water) consists essentially of water.

The conductive material included in the non-aqueous composition for conductive layer formation is a conductive material having an average particle size $(D_A)$ smaller than the average particle size $(D_B)$ of the conductive material included in the aqueous composition for active material layer formation. By using a conductive material having an average particle size that satisfies the relationship $D_A < D_B$, active material layers 36 comprising a conductive material having a large average particle size are overlaid on conductive layers 34 comprising a conductive material having a small average particle size. Adherence between layers increases as a result on account of the anchor effect elicited by the conductive materials having dissimilar average particle sizes. This reinforces the effect of preventing delamination between layers (and also delamination within layers).

The particle size ratio $(D_B/D_A)$ of the average particle size $(D_A)$ of the conductive material in the conductive layers 34 and the average particle size $(D_B)$ of the conductive material in the active material layers 36 satisfies the relationship $(D_B/D_A) > 1.28$ (preferably, $(D_B/D_A) > 1.37$, more preferably $(D_B/D_A) > 1.40$). The anchor effect of the conductive material can be brought out yet more distinctly when using conductive materials such that the average particle size $(D_B)$ of the conductive material in the active material layers 36 is 1.28 times or more greater than the average particle size $(D_A)$ of the conductive material in the conductive layers. The above particle size ratio makes delamination between layers less likely, also under high-rate charge and discharge. This has the effect of preventing formation of compounds having high electric resistivity and which give rise to corrosion of the positive electrode collector 32.

The specific surface area $(C_A)$ [m²/g] of the conductive material and the weight per unit surface area $(W_A)$ [g/m²] of the conductive material in the conductive layers 34, and the specific surface area $(C_B)$ [m²/g] of the conductive material and the weight per unit surface area $(W_B)$ [g/m²] of the conductive material in the active material layers 36 satisfy the relationship $(C_B W_B / C_A W_A) < 5.4$ (preferably, $(C_B W_B / C_A W_A) < 5.0$, more preferably $(C_B W_B / C_A W_A) < 4.5$). Charge is transferred with high efficiency, and conductivity (conductive paths) with the collector is enhanced, in a positive electrode where the specific surface area and weight per unit surface area of the respective conductive materials in the conductive layers 34 and the active material layers 36 satisfy the above relationships.

The active material layers 36 can be formed by applying the prepared aqueous paste for active material layer formation onto the conductive layers 34, followed by drying of the solvent included in the paste. Appropriate techniques identical to those of the above-mentioned methods can be employed for applying the aqueous paste for active material layer formation onto the conductive layers 34. The active material layers 36 may be formed over substantially the entire surface of the conductive layers 34, or just on part of the surface of the conductive layers 34. In terms of the effect elicited by forming the active material layers 36 and the durability and so forth of the active material layers 36, the active material layers 36 are preferably formed ordinarily in such a manner so as to cover substantially the entire surface of at least the conductive layers 34. In positive electrodes having conductive layers 34 formed on a positive electrode collector 32, part of the positive electrode collector 32 may be left with no conductive layers 34 formed thereon, so that part of the active material layers 36 are provided extending up to portions where the conductive layers 34 are not formed, so long as the effect of the present invention is not noticeably impaired thereby.

The lithium secondary battery 100 comprising a positive electrode obtainable in accordance with the present invention is not particularly limited, and may be similar to a conventional lithium secondary battery comprising a positive electrode, so long as the latter comprises the above-described conductive layers 34 and active material layers 36. Other constituent elements of the lithium secondary battery are explained below. The present invention, however, is in no way meant to be limited to the described embodiments.

For instance, the negative electrode sheet 40 may comprise negative electrode active material layers 44 formed on an elongated negative electrode collector 42 (for instance, copper foil). One, two or more substances conventionally used in lithium secondary batteries can be used, without any particular limitations, as the negative electrode active material, capable of storing and releasing lithium, that makes up the negative electrode active material layers 44. Carbon particles, for instance, are an example of an appropriate negative electrode active material. A particulate carbon material (carbon particles) having a graphite structure (lamellar structure), at least partially, is preferably used. Appropriate carbon materials that can be used include so-called graphitic substances (graphite), non-graphitizable carbonaceous substances (hard carbon), graphitizable carbonaceous substances (soft carbon), as well as materials whose structure is a combination of the foregoing. Graphite particles, in particular, afford a negative electrode active material that is more appropriate for high-rate charge and discharge, thanks to their small particle size and large surface area per unit volume.

Besides the negative electrode active material, the negative electrode active material layers 44 may also contain, as the case may require, one, two or more materials that are blended into ordinary lithium secondary batteries. As such materials there can also be used various polymer materials that are capable of functioning as the binders illustrated above as constituent materials of the conductive layers 34 and the active material layers 36.

Preferably, the negative electrode active material layers 44 can be prepared by dispersing or dissolving the negative electrode active material, the binder and so forth in an appropriate solvent (water, organic solvent, or an mixed solvent thereof), and by coating then the prepared paste-like or slurry-like composition on the negative electrode collector 42, followed by solvent drying and compression.

The separators 50A, 50B are sheets interposed between the positive electrode sheet 30 and the negative electrode sheet 40, and are disposed so as to come into contact with the conductive layers 34 and the active material layers 36 of the positive electrode sheet 30, and the negative electrode active material layers 44 of the negative electrode sheet 40, respectively. Moreover, the function of the separators 50A, 50B is to prevent shorts caused by contact between the electrode active material layers 36, 44 of the positive electrode sheet 30 and the negative electrode sheet 40, and to form conduction paths (conductive paths) between electrodes, by way of the electrolyte that impregnates the voids in the separators 50A, 50B. A porous sheet comprising a resin (micro-porous resin sheet) can be preferably used as the constituent material of the separators 50A, 50B. Preferred examples thereof include, for instance, porous polyolefin resins such as polypropylene, polyethylene and polystyrene.

The electrolyte according to the present embodiment is a non-aqueous electrolyte (typically, a non-aqueous liquid electrolyte), containing lithium ions, in the form of a non-aqueous solvent-based electrolyte solution resulting from dissolving a lithium salt, as a supporting salt, in a non-aqueous solvent (organic solvent). For instance, an electrolyte employed in ordinary lithium secondary batteries can be used as the electrolyte of the present embodiment. As the non-aqueous solvent included in the electrolyte there can be preferably used one, two or more solvents from among, for instance, ethylene carbonate (EC), diethyl carbonate (DEC), dimethyl carbonate (DMC) and propylene carbonate. As the lithium supporting salt there can be used, for instance, one, two or more salts from among $LiPF_6$, $LiClO_4$, $LiAsF_6$, $Li(CF_3SO_2)_2N$, $LiBF_3$ and $LiCF_3SO_3$.

The lithium secondary battery 100 according to the present embodiment can be built by stacking, and then winding, the positive electrode sheet 30 and the negative electrode sheet 40 prepared as described above, together with two separators 50A, 50B, stuffing the obtained wound electrode body 20 in a battery case 10, and infusing thereafter the electrolyte into the case, which is then sealed.

The structure, size and material (for instance, case made of metal or of laminate film) of the battery case 10, the structure of the electrode body having, as main constituent elements, the positive and negative electrodes (for instance, wound structure or stacked structure), among others, are not particularly limited.

Test examples relating to the present invention are explained below, but the present invention is in no way meant to be limited to such specific examples.

In a first test example there was evaluated, based on impedance measurements, whether differences in resistance arise between positive electrodes for lithium secondary batteries that have dissimilar average particle size ratios between the conductive materials included in the active material layers and the conductive layers. The specific method is as follows.

Manufacture of the Positive Electrode for Lithium Secondary Batteries

A positive electrode for lithium secondary batteries was manufactured. To form the conductive layers of the positive electrode, a non-aqueous composition for conductive layer formation was prepared by mixing polyvinylidene fluoride (PVDF), as the binder, and acetylene black as the conductive material, to a wt % ratio of 72:28, in N-methyl-2-pyrrolidone (NMP).

The resulting composition was coated, using a coating device, onto both faces of aluminum foil about 10 μm thick, as the positive electrode collector. After coating, the composition was dried, and was drawn into a sheet shape in a roller press, to form conductive layers on the surface of the positive electrode collector. The coating amount was adjusted in such a manner that the total weight ($W_A+W_C$) of the weight per unit surface area ($W_A$) [g/m$^2$] of the conductive material and the weight per unit surface area ($W_C$) [g/m$^2$] of the binder in the conductive layers were both about 2.0 g/m$^2$ per face of the positive electrode collector.

The active material layers were overlaid then on the conductive layers. To that end there was prepared a positive electrode active material included in the active material layers. Specifically, a reactive crystallization method was used to precipitate nickel hydroxide by adding an aqueous solution of a nickel salt and an aqueous solution of an alkali hydroxide to an aqueous solution in which metallic cobalt and aluminum had been suspended beforehand. The nickel hydroxide and the lithium hydroxide were then fired to yield a lithium-nickel complex oxide $LiNiO_2$.

The $LiNiO_2$ prepared above as the positive electrode active material, acetylene black as the conductive material, and carboxymethylcellulose (CMC) as the binder were mixed in deionized water to a wt % ratio of the foregoing materials of 100:10:1, to prepare thereby an aqueous composition for active material layer formation. The prepared composition was coated onto the conductive layers using a coating device, and then water was removed. The active material layers were formed then through drawing to a sheet shape using a roller press.

There were prepared six samples having respectively dissimilar particle size ratios ($D_B/D_A$) of the average particle size ($D_A$) of the conductive material acetylene black included in the non-aqueous composition for conductive layer formation and the average particle size ($D_B$) of the conductive material acetylene black included in the aqueous composition for active material layer formation. The particle size ratios ($D_B/D_A$) of samples 1 to 6 are given in Table 1.

TABLE 1

| Sample number | 1 | 2 | 3 | 4 | 5 | 6 |
|---|---|---|---|---|---|---|
| Average particle size ($D_A$) nm | 26 | 35 | 37.6 | 42.8 | 48 | 70 |
| Average particle size ($D_B$) nm | 48 | 48 | 48 | 48 | 48 | 48 |
| Particle size ratio ($D_B/D_A$) | 1.85 | 1.37 | 1.28 | 1.12 | 1.00 | 0.69 |

A separator about 30 μm thick made of porous polypropylene was sandwiched between two positive electrode sheets prepared by overlaying the active material layers on the conductive layers, and external electrodes were joined to the ends of the positive electrode sheets. The stack of the separator and the positive electrode sheets was stuffed in a laminate case, and then an electrolyte was poured into the case. The electrolyte used was a solution of a supporting salt $LiPF_6$ dissolved, to a concentration of 1 mol/L, in a mixed solvent of ethylene carbonate (EC), dimethyl carbonate (DMC) and ethyl methyl carbonate (EMC) at a volume ratio 1:1:1. The opening of the case was sealed after pouring the electrolyte.

An appropriate electrolyte impregnation treatment was carried out thereafter (for instance, vacuum impregnation down to 200 Ton), to cause the electrolyte to thoroughly impregnate the pores of the positive electrode. The impedance of samples 1 to 11 was measured then. Impedance was measured through a sweep of measurement frequencies. DC resistance was read from a Cole-Cole plot.

Figure 4:
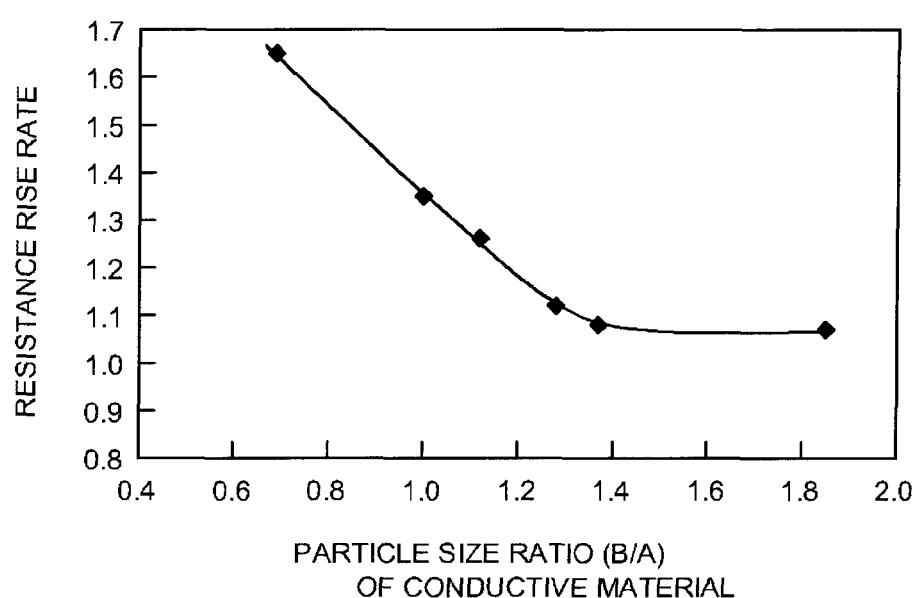
FIG. 4 is a graph plotting resistance rise rate versus a particle size ratio ($D_B/D_A$) of the average particle size ($D_A$) of a conductive material included in a non-aqueous composition for conductive layer formation and the average particle size ($D_B$) of a conductive material included in an aqueous composition for active material layer formation of a positive electrode for lithium secondary batteries prepared in an example.

The same impedance measurement was carried out in samples 1 to 6 after having been stored at 60° C. for 3 days. The results are illustrated in FIG. 4. In FIG. 4, the abscissa axis represents the particle size ratio ($D_B/D_A$) of the average particle size ($D_A$) of the acetylene black included in the non-aqueous composition for conductive layer formation and the average particle size ($D_B$) of the acetylene black included in the aqueous composition for active material layer formation. The ordinate axis represents the rate or rise in DC resistance after storage at 60° C. for 3 days, obtained based on impedance measurement results.

As FIG. 4 shows, the positive electrodes in samples 1 to 3 exhibited a resistance rise rate no greater than 1.3. It was thus found that the rise in resistance was small for positive electrodes where the particle size ratio ($D_B/D_A$) of the acetylene black was 1.85 (sample 1), 1.37 (sample 2) and 1.28 (sample 3), even after storage at 60° C. for 3 days.

By contrast, the positive electrodes of samples 4 to 6, where the particle size ratio ($D_B/D_A$) of the acetylene black was smaller than in the above samples, exhibited a substantial resistance rise rate after storage.

In a second test example there was evaluated, based on impedance measurements, whether differences in resistance arise between positive electrodes for lithium secondary batteries having dissimilar values of the relationship ($C_B W_B/C_A W_A$) between the specific surface area ($C_A$) [m²/g] and the weight per unit surface area ($W_A$) [g/m²] of the conductive material in the conductive layers, and the specific surface area ($C_B$) [m²/g] and the weight per unit surface area ($W_B$) [g/m²] of the conductive material in the active material layers. The specific method is as follows.

Manufacture of the Positive Electrode for Lithium Secondary Batteries

Positive electrodes for lithium secondary batteries were manufactured in the same way as in the first test example. Herein, ten samples were prepared differing only as regards the feature below. Specifically, there were prepared ten samples 7 to 16 having different values of the relationship ($C_B W_B/C_A W_A$) between the specific surface area ($C_A$) [m²/g] and the weight per unit surface area ($W_A$) [g/m²] of the conductive material acetylene black in the conductive layers, and the specific surface area ($C_B$) [m²/g] and the weight per unit surface area ($W_B$) [g/m²] of the conductive material acetylene black in the active material layers. Table 2 summarizes the values of the specific surface area ($C_A$) [m²/g] and the weight per unit surface area ($W_A$) [g/m²] of the conductive material in the positive electrode in samples 7 to 16, as well as the value ($C_B W_B/C_A W_A$).

The samples were prepared in such a manner that the specific surface area ($C_B$) [m²/g] of the conductive material in the active material layers was 39 [m²/g], and the weight per unit surface area ($W_B$) [g/m²] of the conductive material in the active material layers was 4.8 [g/m²], for all the samples.

TABLE 2

| Sample number | 7 | 8 | 9 | 10 | 11 |
|---|---|---|---|---|---|
| Weight of conductive material per unit surface area in conductive layers ($W_A$) | 0.56 | 0.7 | 0.56 | 0.532 | 0.532 |
| Specific surface area of conductive material in conductive layers ($C_A$) | 133 | 68 | 68 | 68 | 68 |
| ($C_B W_B/C_A W_A$) value | 2.51 | 3.93 | 4.92 | 5.17 | 5.17 |

| Sample number | 12 | 13 | 14 | 15 | 16 |
|---|---|---|---|---|---|
| Weight of conductive material per unit surface area in conductive layer ($W_A$) | 0.56 | 0.476 | 0.521 | 0.77 | 0.42 |
| Specific surface area of conductive material in conductive layers ($C_A$) | 62.2 | 68 | 58.9 | 39 | 68 |
| ($C_B W_B/C_A W_A$) value | 5.37 | 5.78 | 6.10 | 6.23 | 6.55 |

Figure 5:
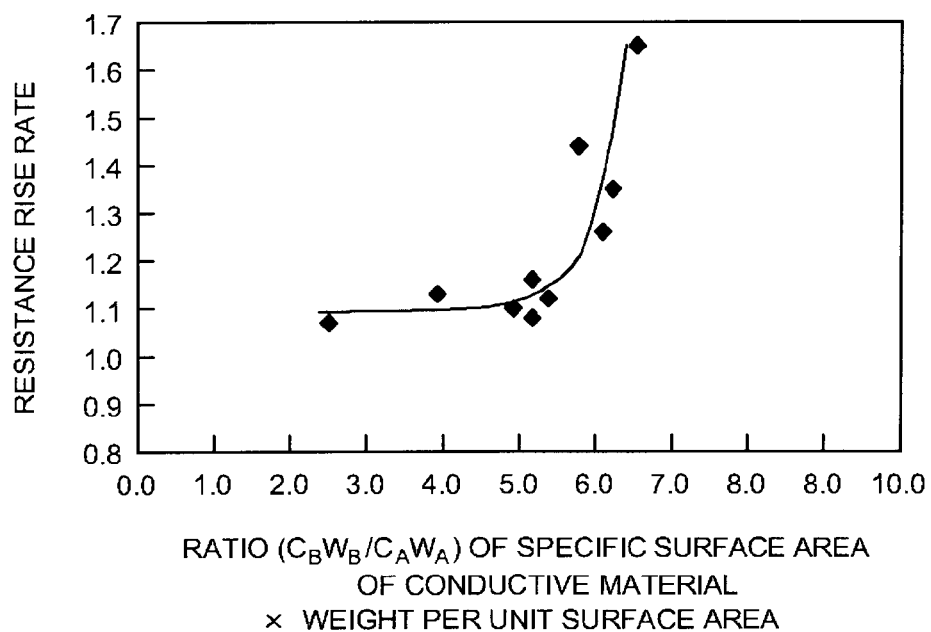
FIG. 5 is a graph plotting resistance rise rate versus a value ($C_B W_B / C_A W_A$) of a relationship between a specific surface area ($C_A$) [m²/g] of a conductive material acetylene black and a weight per unit surface area ($W_A$) [g/m²] of the conductive material in a conductive layer, and a specific surface area ($C_B$) [m²/g] of a conductive material acetylene black and a weight per unit surface area ($W_B$) [g/m²] of the conductive material in an active material layer in a positive electrode for lithium secondary batteries prepared in an example.

Thereafter, an appropriate electrolyte impregnation treatment was carried out in the same way as in the first test example, and then the impedance of samples 7 to 16 was measured. The same impedance measurement was carried out in samples 7 to 16 after having been stored at 60° C. for 3 days. The results are illustrated in FIG. 5. In FIG. 5, the abscissa axis represents the value ($C_B W_B/C_A W_A$) of the relationship between the specific surface area ($C_A$) [m²/g] and the weight per unit surface area ($W_A$) [g/m²] of the conductive material acetylene black in the conductive layers, and the specific surface area ($C_B$) [m²/g] and the weight per unit surface area ($W_B$) [g/m²] of the conductive material acetylene black in the active material layers. The ordinate axis represents the increase in DC resistance after storage at 60° C. for 3 days, obtained based on impedance measurement results.

As illustrated in FIG. 5, the positive electrodes of samples 7 to 12 exhibited a small rise in resistance, namely a resistance rise rate no greater than 1.2, even after storage at 60° C. for 3 days. By contrast, the positive electrodes in samples 13 to 16 exhibited a substantial resistance rise rate after storage.

In the above results, the positive electrodes of samples 7 to 12, where the ($C_B W_B/C_A W_A$) value ranged from 2.51 (sample 7) to 5.37 (sample 12), exhibited a small resistance rise rate, whereas the positive electrodes of samples 13 to 16, where the ($C_B W_B/C_A W_A$) value was higher, exhibited a substantial resistance rise rate.

The present invention as explained in detail above is not limited to the above-described embodiments and examples. The invention as disclosed herein includes various alterations and modifications to the specific examples described above. For instance, the invention is not limited to wound-type batteries, and can be appropriately used in lithium secondary batteries of various shapes. Likewise, the size and other features of the battery can be appropriately modified in accordance with the intended application (typically on-board applications).

INDUSTRIAL APPLICABILITY

Figure 6:
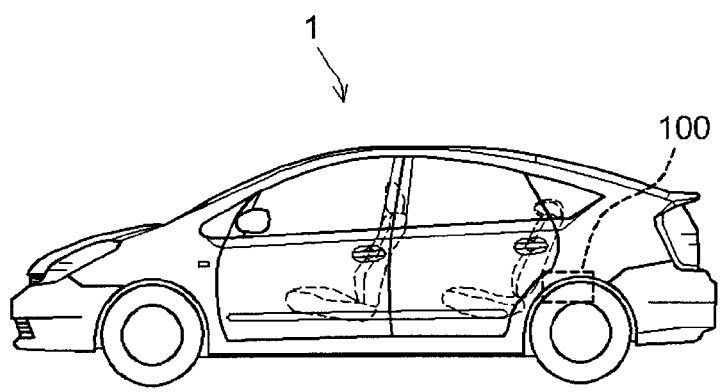
FIG. 6 is a side-view diagram illustrating schematically a vehicle (automobile) equipped with the lithium secondary battery of the present invention.

By virtue of a build-up wherein the conductive layers 34 are provided on the surface of the positive electrode collector 32 and the active material layers 36 are overlaid on the conductive layers, as described above, the positive electrode of the lithium secondary battery 100 according to the present invention is less prone to delaminate between layers, even under high-rate charge and discharge, and is less likely to undergo formation of high-electric resistivity compounds that give rise to corrosion of the positive electrode collector. Thanks to such characteristics, the lithium secondary battery 100 comprising the positive electrode according to the present invention can be suitably used, in particular, as a power source in motors provided in vehicles such as automobiles or the like. As illustrated in FIG. 6, therefore, the present invention provides a vehicle 1 (a vehicle equipped with an electric motor, typically an automobile and in particular a hybrid automobile, an electric automobile or a fuel cell automobile) comprising, as a power source, such a lithium secondary battery 100 (which may be embodied as a battery pack comprising a plurality of lithium secondary batteries 100 connected is series).

The invention claimed is:

1. A positive electrode for lithium secondary batteries comprising a conductive layer overlaid on the surface of a positive electrode collector, and an active material layer overlaid on the conductive layer,
    wherein said conductive layer comprises at least one water-insoluble polymer, as a first binder, that is soluble in organic solvents, and a first conductive material,
    said active material layer comprises at least one aqueous polymer, as a second binder, that is soluble or dispersible in water, a positive electrode active material, and a second conductive material,
    the average particle size ($D_A$) of the first conductive material in said conductive layer is smaller than the average particle size ($D_B$) of the second conductive material in said active material layer, and
    wherein a relationship between a specific surface area ($C_A$) [m²/g] of the first conductive material in the conductive layer and a weight of the first conductive material in the conductive layer per a unit surface area of the conductive layer ($W_A$) [g/m²], and a specific surface area ($C_B$) [m²/g] of the second conductive material in the active material layer and a weight of the second conductive material in the active material layer per a unit surface area of the active material layer ($W_B$) [g/m²] satisfies ($C_B W_B / C_A W_A$)<5.4.

2. The positive electrode according to claim 1, wherein a particle size ratio ($D_B/D_A$) of the average particle size ($D_A$) of the first conductive material in said conductive layer and the average particle size ($D_B$) of the second conductive material in said active material layer satisfies the relationship ($D_B/D_A$)>1.28.

3. The positive electrode according to claim 1, wherein a total sum ($W_A + W_C$) of a weight of the first conductive material in the conductive layer per unit surface area of the conductive layer ($W_A$) [g/m²] and a weight of the first binder in the conductive layer per unit surface area of the conductive layer ($W_C$) [g/m²] ranges from 0.25 g/m² to 5.0 g/m², per face of said collector.

4. The positive electrode according to claim 2, wherein a total sum ($W_A + W_C$) of a weight of the first conductive material in the conductive layer per unit surface area of the conductive layer ($W_A$) [g/m²] and a weight of the first binder in the conductive layer per unit surface area of the conductive layer ($W_C$) [g/m²] ranges from 0.25 g/m² to 5.0 g/m², per face of said collector.

5. The positive electrode according to claim 1, wherein the content of the first conductive material in said conductive layer ranges from 20 wt % to 50 wt %, relative to a total 100 wt % of said water-insoluble polymer and said conductive material in said conductive layer.

6. The positive electrode according to claim 1, wherein said first conductive material comprises particulate carbon, and the second conductive material comprises particulate carbon.

7. The positive electrode according to claim 1, wherein said conductive layer comprises polyvinylidene fluoride as the first binder, and said active material layer comprises carboxymethylcellulose as the second binder.

8. A lithium secondary battery, comprising the positive electrode according to claim 1.

9. A vehicle, comprising the lithium secondary battery according to claim 8.

10. A method for manufacturing a positive electrode for lithium secondary batteries, the positive electrode having a multilayer structure that comprises a conductive layer overlaid on the surface of a positive electrode collector, and an active material layer overlaid on the conductive layer, the method comprising:
    forming said conductive layer using a non-aqueous composition for conductive layer formation that comprises at least one water-insoluble polymer, as a first binder, that is soluble in organic solvents, and a first particulate conductive material; and
    forming said active material layer using an aqueous composition for active material layer formation that comprises at least one aqueous polymer, as a second binder, that is soluble or dispersible in water, and a second particulate conductive material,
    wherein the average particle size ($D_A$) of the first particulate conductive material included in the non-aqueous composition for conductive layer formation is smaller than the average particle size ($D_B$) of the second particulate conductive material included in the aqueous composition for active material layer formation, and
    wherein a relationship between a specific surface area ($C_A$) [m²/g] of the first particulate conductive material in the conductive layer and a weight of the first particulate conductive material in the conductive layer per a unit surface area of the conductive layer ($W_A$) [g/m²], and a specific surface area ($C_B$) [m²/g] of the second particulate conductive material in the active material layer and a weight of the second particulate conductive material in the active material layer per a unit surface area of the active material layer ($W_B$) [g/m²] satisfies ($C_B W_B / C_A W_A$)<5.4.

11. The manufacturing method according to claim 10, wherein said non-aqueous composition for conductive layer formation and said aqueous composition for active material layer formation are prepared in such a manner that a particle size ratio ($D_B/D_A$) of the average particle size ($D_A$) of the first particulate conductive material included in said non-aqueous composition for conductive layer formation and the average particle size ($D_B$) of the second particulate conductive material included in said aqueous composition for active material layer formation is ($D_B/D_A$)>1.28.

12. The manufacturing method according to claim 10, wherein polyvinylidene fluoride is used as the first binder included in said non-aqueous composition for conductive layer formation, and carboxymethylcellulose is used as the second binder included in said aqueous composition for active material layer formation.

* * * * *